United States Patent [19]

Joguet et al.

[11] Patent Number: 4,894,655
[45] Date of Patent: Jan. 16, 1990

[54] LANDING ASSISTANCE SYSTEM USING NAVIGATION SATELLITES

[75] Inventors: Jean C. Joguet, Noisy Le Roy; Michel Schilliger, Morangis, both of France

[73] Assignee: LMT Radioprofessionnelle, Boulogne Billancourt, France

[21] Appl. No.: 161,099
[22] Filed: Feb. 26, 1988
[30] Foreign Application Priority Data

Feb. 27, 1987 [FR] France ................................ 87 02648

[51] Int. Cl.[4] ................................................. G01S 1/02
[52] U.S. Cl. .................................... 340/988; 340/945; 342/357; 364/449; 364/460
[58] Field of Search ................ 340/988, 993, 989, 947, 340/952, 945; 342/352, 356, 357, 358, 408; 364/439, 444, 449, 460, 424

[56] References Cited

U.S. PATENT DOCUMENTS

| | | | |
|---|---|---|---|
| 3,242,494 | 3/1966 | Gicca | 342/357 |
| 4,359,733 | 11/1982 | O'Neill | 342/36 |
| 4,613,864 | 9/1986 | Hofgen | 364/449 |
| 4,635,064 | 1/1987 | Chisholm | 342/408 |
| 4,701,760 | 10/1987 | Raoux | 364/449 |

FOREIGN PATENT DOCUMENTS

87/06713 11/1987 World Int. Prop. O. .......... 342/357

OTHER PUBLICATIONS

"Time Dissemination Using Navstar", Yakos et al., May 1981, USAERADCOM Frequency Control Symposium, cl. 342–357.
IEEE Plans '86 Position Location and Navigation Symposium, Record 86 CH 2365-5, Las Vegas, Nev., Nov. 4–7, 1985, sponsored by IEEE AES Society, pp. 169–176, IEEE, New York, U.S.A.; J. Beser: "Highly Accurate Hydrographic Surveys Using Differential GPS" p. 170, colonne de gauche, ligne 5–p. 173, colonne de gauche, ligne 24; FIGS. 1–3*.
IEEE Plan '86 Position Location and Navigation Symposium, Record 86 CH 2365-5 Las Vegas, Nev., Nov. 4–7, 1986, sponsored by IEEE AES Society, pp. 297–302, IEEE, New York, U.S.A.; K. Hervig: "Diffstar-A project based on differential GPS in Northern Norway" *pp. 297–300*.
National Telecommunications Conference, Nov. 30–Dec. 4, 1980, Houston, Tex., effective 1982 (Global Communications Conference), Conference Record, vol. 1, des 4, sponsored by the Institute of Electrical and Electronics Engineers, Inc. etc., pp. 21.1.1–21.1.6, New York, U.S.A.; J. Reynolds et al., "Navstar Global Positioning Systems" *pp. 21.1.2, et 3, paragraphe V.B.*.
IEEE Plans '86 Position Location and Navigation Symposium, Record 86 CH 2365-5 Las Vegas, Nev., Nov. 4–7, 1986, sponsored by IEEE AES Society, pp. 330–342, IEEE New York, U.S.A.; M. B. El-Arini et al.: "Integrity of the Microwave Landing System (MLS) Data Functions" *p. 330, colonne de gauche, lignes 1–32*.
National Telecommunications Conference, Nov. 30–Dec. 4, 1980, Houston, Tex., effective 1982, (Global Communications Conference), Conference Record, vol. 1, des 4, sponsored by the Institute of Electrical and Electronics Engineers Inc. etc., IEEE, New York, U.S.A.; AV AN Leeuwen: "Space Shuttle Application of a GPS Navigation System" *p. 21.3.2, et 3, paragraphe: "Orbiter and Payload Navigation Requirements"; FIG. 6*.

Primary Examiner—Joseph A. Orsino
Assistant Examiner—Brent A. Swarthout
Attorney, Agent, or Firm—Oblon, Spivak, McClelland, Maier & Neustadt

[57] ABSTRACT

The system according to the invention uses GPS/NAVSTAR navigation satellites and includes:
a fixed station located in the vicinity of the landing zone, containing a receiver for positioning by satellite that gives an estimate of the position of this fixed station and computing means that give correction data representing the deviation between this estimate and a reference position; and a data transmitter transmitting, in particular, these correction data on a radio channel which is conventionally used to transmit data in a microwave landing system called the MLS system;
an on-board station in each aircraft comprising: an MLS receiver capable of receiving the ancillary data transmitted by the MLS system, a receiver for positioning by satellite and a computing device by which the correction data can be used to correct an estimate of position given by the positioning receiver.

4 Claims, 2 Drawing Sheets

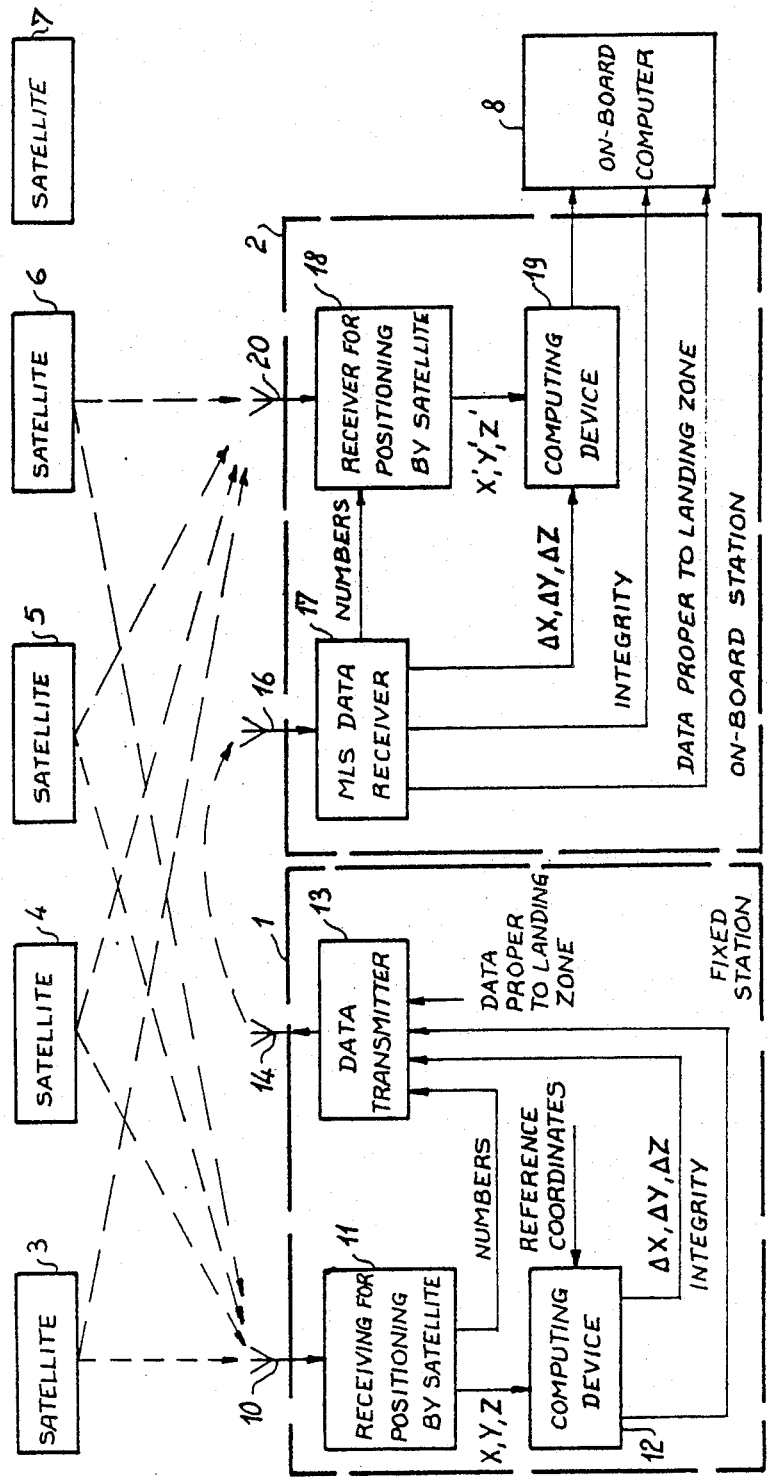
FIG_1

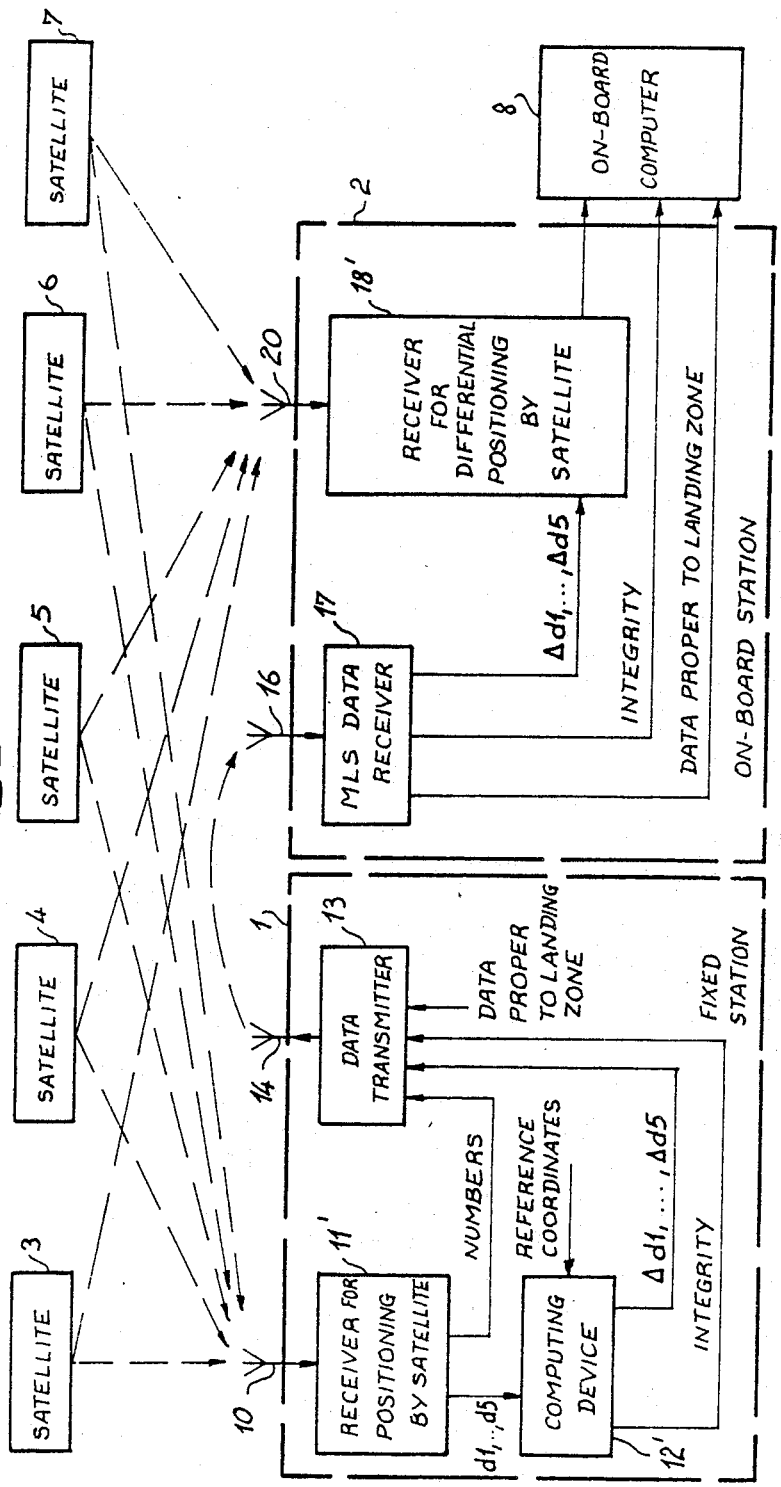
FIG_2

LANDING ASSISTANCE SYSTEM USING NAVIGATION SATELLITES

BACKGROUND OF THE INVENTION

1. Field of the Invention

The invention pertains to a landing assistance system for aircraft.

2. Description of the Prior Art

The most recent landing assistance system, which is a standardized one, is a microwave landing system called MLS. It has two narrow microwave beams which do a vertical scanning and a horizontal scanning, respectively, in the direction of a landing strip. These two beams are used to determine the position of an aircraft in a vertical plane and a horizontal plane respectively. This MLS system is currently installed or will be installed in all big airports, but has the disadvantage of requiring complicated infrastructure for each landing strip. This infrastructure is, firstly, too expensive for small airports and, secondly, too complicated to be set up quickly, for tactical needs, at a military landing strip.

Furthermore, there are very precise known positioning systems that use navigation satellites, for example the positioning system called NAVSTAR/GPS. A system of this type comprises several satellites. Each satellite emits signals controlled by an atomic clock and comprising, notably, almanac data which make it possible to ascertain the position of the satellite with respect to a geodesic reference point. A positioning receiver, placed on board an aircraft for example, is used to determine the position of this aircraft by simultaneously receiving the signals emitted by several satellites located in direct line of view at a given moment. A constellation of eighteen satellites is provided for, in order to enable reception from four or five satellites at any instant at any point on the earth. Each positioning receiver has a computing device, used to compute the position of the aircraft in three dimensions at high speed, using all the cumulated phase data of the carrier emitted by each satellite and using the phase of a code modulating this carrier.

A differential method described, for example, in the French Journal NAVIGATION, No. 137, pages 88 to 91, Jan. 1987, makes it possible to improve the positioning precision achieved through the GPS system. By this differential method, the precision obtained is of about 3 meters on an average and makes it possible to envisage the use of the GPS system as an aircraft landing assistance system. According to this differential method, the system comprises a fixed station which constitutes a reference for aircraft located in the vicinity of the said fixed station, within a radius of 100 kilometers for example. The fixed station has a receiver for positioning by satellite, which gives an estimate of the position of this fixed station, and computing means that give correction data representing the deviation between this estimate and a reference position, which may be the position of the fixed station identified on a map. After eliminating the essential part of the lag of the clock incorporated in the receiver of the fixed station, the distances observed for each satellite, called pseudo-distances, are compared with the exact differences calculated from the almanac data transmitted by the satellites and from the reference position. The result of these computations give correction data, used to compensate for most of the errors arising out of satellite ephemerides and out of uncertainties in the propagation of radio waves.

The fixed station further comprises radio transmission means to transmit the correction data to aircraft. The station on board each aircraft comprises, in addition to the receiver for positioning by satellite, radio reception means to receive the correction data and computing means for correcting, by means of the correction data, the position estimate given by the positioning receiver. This computing device may be incorporated in the positioning receiver, which is then called a differential positioning receiver and directly gives the value of the corrected estimate.

The corrected estimate is precise enough to be used to guide a landing operation, but requires additional reception equipment. However, for reasons related to space factor and cost, it is not desirable to increase the quantity of equipment on aircraft so that they can use another landing assistance system that complements the MLS system.

SUMMARY OF THE INVENTION

The aim of the invention is to propose a landing assistance system which can be used to replace the MLS system for landing strips that cannot be provided with this system, without considerably increasing the cost of navigation and landing assistance equipment already used on board the aircraft. The object of the invention is a system essentially comprising, on board each aircraft, a conventional receiver designed for MLS type landing assistance and a conventional receiver of the GPS type for positioning by satellite.

According to the invention, a landing assistance system using navigation satellites comprises: several navigation satellites emitting signals controlled by a clock, a fixed station located in the vicinity of the landing strips and a station on board each aircraft, the said fixed station comprising:

a receiver for positioning by satellite, the said receiver giving an estimate of the position of the said fixed station, and computing means giving correction data representing the deviation between this estimate and a reference position;

radio transmission means to trnnsmit the correction data, transmitting in a radio channel according to the standards of the microwave landing system known as MLS;

and the said on-board station comprising:

a conventional radio receiver to receive data transmitted by a microwave landing system known as MLS;

a receiver for positioning by satellite and computing means that give an estimate of the position of the aircraft, corrected by means of correction data received by the radio receiver.

BRIEF DESCRIPTION OF THE DRAWINGS

FIGS. 1 and 2 represent block diagrams of two embodiments of the system according to the invention.

DESCRIPTION OF TWO PREFERRED EMBODIMENTS

The embodiment shown in FIG. 1 comprises several satellites of the GPS/NAVSTAR system, 3 to 7, a fixed station 1 constituting the reference station and a station 2 on board an aircraft (not shown). The fixed station 1 comprises: a receiver 11 for non-differential positioning by satellite, a computing device 12 and a data transmitter 13.

The receiver 11 is a receiver for non-differential positioning by GPS/NAVSTAR satellite. The said receiver is, for example, a TRIMBLE 10X receiver marketed by the TRIMBLE firm. It is connected to an antenna 10 that can receive the signals emitted by all satellites in direct line of view. It has a first output, connected to an input of the computing device 12, to give it an estimate X, Y, Z of the geodesic coordinates of the position of the fixed station 1, calculated conventionally from the signals received from four satellites 3 to 6 from among all the satellites 3 to 7, which are in a direct line view at the instant considered. This computation consists essentially in determining the pseudo-distances between the fixed station 1 and these four satellites 3 to 6, and then in deducing therefrom the geodesic coordinates of the fixed station using the almanac data which are transmitted by these satellites and which make it possible to ascertain, at any instant, the position of the said satellites with reference to the earth. The receiver 11 has a second output connected to an input of the data transmitter 13 to give it the numbers of the satellites, the signals of which are used to estimate the coordinates X, Y, Z.

The computing device 12 further has an input that receives three reference coordinates which are constant. It calculates the deviation between these reference coordinates and the coordinates X, Y, Z and deduces therefrom correction data marked ΔX, ΔY, ΔZ. It has an output connected to an input of the transmitter 13 to give it these correction data. The reference coordinates may be either the exact geodesic position of the fixed station 1, if it is known, or the position which has been determined by the receiver 11 at a prior instant and has been memorized once and for all.

The computing device 12 consists of a conventional microprocessor base computing device. It also has the function of giving a so-called integrity datum, indicating that the signals of the satellites, used to determine the coordinates X, Y, Z, are of adequate quality. The device 12 has an output connected to an input of the transmitter 13 to give it this integrity datum.

The data transmitter 13 has an input receiving a sequence of data which is proper to the landing zone: for example, the angle of the direction of a landing strip with respect to the magnetic north, the coordinates of the approach end of the strip and the identity of the strip. The coordinates of the approach end of the strip, transmitted by the transmitter 13, should relate to the same reference point as the reference coordinates given to the computing device 12 of the fixed station 1. The coordinates transmitted are the geodesic coordinates of the approach end of the strip in cases where the reference coordinates are the geodesic coordinates of the fixed station 1. The coordinates transmitted are coordinates measured by using the system according to the invention, in cases where the reference coordinates are coordinates that have been measured by means of the receiver 11 of the station 1 at a prior instant, and been memorized once and for all. For this, an aircraft is placed at the approach end of the strip and a series of position measurements is done with an on-board station. The transmitter 13 has an output connected to an omni-directional antenna 14 in the horizontal plane. It transmits on a radio channel which is usually dedicated to the transmission of ancillary data for the MLS type landing assistance system. The transmitter 13 transmits, according to the standardized format for the MLS system, the data consisting of the correction data ΔX, ΔY, ΔZ, the integrity datum, the satellite numbers and data proper to the landing zone. The MLS channel frequency used by the transmitter 13 is proper to the landing zone.

The on-board station 2 comprises: a data receiver 17, a receiver 18 for non-differential positioning by satellite and a computing device 19. The data receiver 17 is a conventional receiver used in all aircraft fitted with an MLS type landing assistance system. The said receiver 17 is connected to an antenna 16 which is omnidirectional in the horizontal plane. It is matched by the aircraft pilot to the MLS channel frequency proper to the landing zone. The receiver 17 has a first output connected to an input of the receiver 18 to give it the numbers of the satellites used by the fixed station 1 to estimate the coordinates X, Y, Z. The receiver 17 also has a second output, connected to an input of the computing device 19 to give it the correction data ΔX, ΔY, ΔZ, and third output and a fourth output, respectively connected to two inputs of an on-board computer 8, placed in the aircraft considered, to give it (namely the data receiver 17) the integrity datum and the data proper to the landing zone.

The receiver 18 is connected to an antenna 20 enabling it to receive all the satellites 3 to 7 which are in direct line of view at the instant considered. The receiver 18 is a conventional receiver for non-differential positioning by GPS/NAVSTAR satellite. It has an output that gives an estimate X', Y', Z' of the geodesic coordinates of the aircraft at an input of the computing device 19. The receiver 18 may consist of a TRIMBLE 10X receiver which is lightly modified because the numbers of the satellites whose signals are used by the receiver 18 are not input manually by an operator, but are given by the receiver 17. This modification is not described because it is within the scope of persons skilled in the art. An output of the computing device 19 gives a corrected estimate of the geodesic coordinates of the on-board station 2, computed according to a conventional algorithm, using correction data ΔX, ΔY and ΔZ and estimate data X', Y', Z' given by the receiver 18.

The on-board computer 8 hence receives highly precise coordinates of the position of the aircraft and the integrity datum which guarantees the validity of the signals of the satellites used and that of the correction data. It further receives the angle of the direction of the strip with respect to the magnetic north, the coordinates of the approach end of the strip and, if necessary, any other data proper to the landing zone. The computer 8 is a conventional on-board computer which determines the landing guidance data. These data are given to the human pilot by a landing indicator, or else they are given to the automatic pilot.

The receivers for positioning by satellite conventionally comprise a microprocessor-based computing device. An alternative embodiment of the system according to the invention may lie in the use of the computing device incorporated in the receiver 11 of the fixed station 1 to constitute the computing device 12 through a modification of the programming of the microprocessor which computes positions in the receiver 11.

Similarly, the computations done by the computing device 19 of the on-board station 2 may be done by the microprocessor, which computes positions in the receiver 18, through a modification of the program of this microprocessor. This same microprocessor may be used also to perform some of guidance computations instead of the on-board computer 8.

FIG. 2 is a block diagram of a second embodiment of the system according to the invention. This second embodiment differs from the first embodiment in the type of correction data transmitted from the fixed station 1 to the on-board station 2. In the fixed station 1, the receiver 11 is replaced by a receiver 11' which is a receiver for positioning by satellite. The said receiver gives, in addition to the estimate of the three coordinates X, Y, Z, an estimate of the pseudo-distances measured between the fixed station 1 and all the satellites 3 to 7 respectively, which are in direct line of view of the fixed station 1 at the instant considered.

In this example, the receiver 11' gives five pseudo-distance values, d1, ... d5, which respectively correspond to the satellites 3 to 7. These values are applied to an input of a computing device 12', similar to the computing device 12 but working according to a slightly different program to determine the correction data $\Delta d1$, ... $\Delta d5$, representing the deviation between the estimate of the pseudo-distances d1, ... d5 and the fixed reference values which are computed by the computing device 12'. In this second embodiment, the reference values consist of true values of the pseudo-distances between the fixed station 1 and the satellites 3 to 7, these true values being computed, at a given instant, from the position of each satellite and the position of the fixed station 1. As in the first embodiment, the computing device 12' has an input that receives three fixed reference coordinates. These three coordinates are either the geodesic coordinates of the station 1 or the coordinates were measured by the receiver 11' at a prior instant and were memorized once and for all.

The computing device 12' determines, like the computing device 12, an integrity datum indicating good reception of the signals emitted by the satellites and used to determine the estimate of the pseudo-distances d1, ... d5.

As in the first embodiment, the data transmitter 13 transmits on a channel according to the standards of the MLS landing assistance system and according to a format that complies with these standards. It transmits the correction data for all the satellites that are in direct line of view, the integrity datum, the numbers of the satellites corresponding to the correction data and data proper to the landing zone.

The on-board station 2 differs from that of the first embodiment in the fact that the receiver 18 and the computing means 19 consist of a receiver 18' for differential positioning by satellite. A receiver of this type has an input for correction data transmitted by a fixed reference station. The receiver 18' receives transmissions from all the satellites, 3 to 7, which are in direct line of view, and selects four of them to make an estimate of its position. It does not necessarily select the same satelltes as those selected by the receiver 11' to determine its position.

A conventional receiver for differential positioning by GPS/NAVSTAR satellite, capable of correcting an estimate of its position by means of correction data transmitted by a fixed reference station, can be used practically without modification. For example, the receiver 18' may comprise a TR-5S type receiver marketed by the SERCEL (trademark) firm.

This second embodiment requires a differential positioning receiver in each on-board station 2, but has the advantage of giving better positioning precision for a receiver since the correction is done directly on the pseudo-distances of the satellites, before filtering and estimating the position, unlike the first embodiment where the correction is done after filtering and estimating the position. Another advantage lies in the absence of constraints in the choice of the four satellites used by the receiver 18' to determine its position.

It is also possible to transmit additional correction data in addition to corrections on pseudo-distances. This additional correction data would consist of corrections on the pseudo-speeds of the satellites with respect to the fixed station 1, the true pseudo-speeds being computed by the computing device 12 or 12' using almanac data from the satellites. Known algorithms make it possible to use these additional correction data to compute a corrected estimate of the aircraft position with greater precision.

The invention is not restricted to the two embodiments described above. Many types of receivers for differential as well as non-differential positioning by satellite can be used to make the system of the invention. In all cases, an advantage of the on-board station is that it can be made using an MLS receiver and a receiver for differential positioning by satellite which are in standard use, or are going to come into standard use on aircraft. The fixed station does not require any complicated installation with directional antenna. This means that it can be speedily installed anywhere. It is therefore far less costly to install than an MLS fixed station. Furthermore, one and the same fixed station can be used for several neighboring strips, by transmitting distinct data packets for each strip on the same MLS channel, unlike the case of the MLS system where a separate fixed station is needed for each strip.

What is claimed is:

1. A landing assistance system using navigation satellites, said system comprising several navigation satellites emitting signals controlled by a clock, a fixed station located in the vicinity of landing strips, said fixed station comprising:

a receiver for positioning by satellite, said receiver giving an estimate of the position of said fixed station, and computing means giving correction data representing the deviation between this estimate and a reference position;

radio transmission means transmitting in a radio channel according to the standards of the microwave landing system known as MLS, to transmit correction data, and landing data associated with each landing strip respectively, including the magnetic alignment, the coordinates of the approach, end of the landing strip and the identity of the landing strip;

said system further comprising a station on-board each aircraft, said on-board station comprising:

a conventional radio receiver to receive data transmitted by a microwave landing system known as MLS;

a receiver for positioning by satellite, and computing means that give an estimate of the position of the aircraft, corrected by means of the correction data received by the radio receiver.

2. A landing assistance system according to claim 1 wherein the fixed station receiver for positioning by satellite consists of a conventional receiver for non-differential positioning by satellite, the estimate of the position of the fixed station given by the positioning receiver consisting of an estimate of the three geodesic coordinates of the fixed station, and wherein the correction data essentially consist of the deviations between this estimate and reference values, and of numbers identifying the satellites, the transmissions of which have been used to estimate the position of the fixed station;

and wherein each on-board station's receiver for positioning by satellite comprises a conventional receiver for non-differential positioning by satellite, the corrected estimate of the position of the on-board station consisting of a corrected estimate of the three geodesic coordinates of the on-board station, using transmissions of satellites designated by the numbers transmitted by the fixed station and using correction data transmitted by the fixed station in the radio channel according to the MLS landing system.

3. A landing assistance system according to claim 1 wherein the estimate of the position of the fixed station, given by the fixed station receiver for positioning by satellite, comprises an estimate of the pseudo-distances between the fixed station and each of the system's satellites, the transmissions of which can be received by the fixed station, the correction data essentially comprising the deviations between this estimate and the values computed from the reference values;

and wherein the receiver for positioning by satellite and the computing means of each on-board station comprise a conventional receiver for differential positioning by satellite; the corrected estimate of the position of the on-board station being made by an estimate of the pseudo-distances between the on-board station and several satellites respectively, the transmissions of which can be received by the on-board station, the estimate of these pseudo-distances beeing corrected by means of correction data transmitted by this fixed station on a radio channel according to the standards of the MLS landing system.

4. A landing assistance system according to claim 1 wherein the radio transmission means further transmit data proper to the landing zone, especially the coordinates of the approch end of a landing strip, these coordinates having been measured, in a reference point of the fixed station, by means of a station placed on board an aircraft positioned on this approach end.

* * * * *